(12) United States Patent
Jeon et al.

(10) Patent No.: US 7,677,750 B2
(45) Date of Patent: Mar. 16, 2010

(54) BACKLIGHT ASSEMBLY AND DISPLAY APPARATUS HAVING THE SAME

(75) Inventors: Eun-Chae Jeon, Suwon-si (KR);
Eun-Jeong Kang, Cheonan-si (KR);
Sang-Hoon Lee, Yongin-si (KR);
Si-Joon Song, Yongin-si (KR);
Moon-Hwan Chang, Cheonan-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 66 days.

(21) Appl. No.: 11/832,687

(22) Filed: Aug. 2, 2007

(65) Prior Publication Data
US 2008/0030985 A1   Feb. 7, 2008

(30) Foreign Application Priority Data
Aug. 7, 2006 (KR) .................. 10-2006-0074038

(51) Int. Cl.
G09F 13/04 (2006.01)
(52) U.S. Cl. .............. 362/97.3; 362/800; 362/555; 362/231; 362/612; 349/69
(58) Field of Classification Search .......... 362/231, 362/555, 97.3; 349/69
See application file for complete search history.

(56) References Cited

U.S. PATENT DOCUMENTS

| | | | |
|---|---|---|---|
| 7,220,039 B2 * | 5/2007 | Ahn et al. ........... | 362/612 |
| 7,241,030 B2 * | 7/2007 | Mok et al. ........... | 362/294 |
| 7,387,421 B2 * | 6/2008 | Lee et al. ........... | 362/612 |
| 7,554,625 B2 * | 6/2009 | Koganezawa ......... | 349/61 |
| 2002/0024821 A1 | 2/2002 | Yen | |
| 2004/0218388 A1 | 11/2004 | Suzuki | |
| 2006/0007112 A1 | 1/2006 | Park | |
| 2006/0061539 A1 | 3/2006 | Song et al. | |
| 2006/0279671 A1 * | 12/2006 | Han et al. ........... | 349/61 |

FOREIGN PATENT DOCUMENTS

| DE | 102006002275 A1 | 7/2006 |
|---|---|---|
| JP | 08-030213 | 2/1996 |
| WO | WO 2007/025538 A2 | 3/2007 |

* cited by examiner

*Primary Examiner*—Jong-Suk (James) Lee
*Assistant Examiner*—Robert J May
(74) *Attorney, Agent, or Firm*—F. Chau & Associates, LLC

(57) ABSTRACT

A backlight assembly includes a circuit board and a plurality of point light source groups. The plurality of point light source groups includes N point light sources that generate different respective colors and being arranged on the circuit board. Here, N is a number of point light sources. One light source group of the light source groups is rotated by an angle of predetermined degrees in a clockwise direction or a counter-clockwise direction with respect to another light source group that is adjacent to the one point light source group.

6 Claims, 7 Drawing Sheets

FIG. 7

BACKLIGHT ASSEMBLY AND DISPLAY APPARATUS HAVING THE SAME

CROSS-REFERENCE TO RELATED APPLICATION

This application claims priority to Korean Patent Application No. 2006-74038, filed on Aug. 7, 2006 in the Korean Intellectual Property Office (KIPO), the contents of which are herein incorporated by reference in their entirety.

BACKGROUND OF THE INVENTION

1. Technical Field

The present disclosure relates to a backlight assembly and a display apparatus having the backlight assembly. More particularly, the present disclosure relates to a backlight assembly capable of enhancing display properties by controlling an arrangement of light emitting diodes and reducing the thickness of the assembly and a display apparatus having the backlight assembly.

2. Discussion of Related Art

In general, a liquid crystal display apparatus displays an image using optical and electrical properties of liquid crystal, such as an anisotropic refractive index, or an anisotropic dielectric constant of the liquid crystal. A liquid crystal display apparatus has various advantageous characteristics, such as lighter weight, lower power consumption, lower driving voltage than a display apparatus such as a cathode ray tube, a plasma display panel and so on. Thus, a liquid crystal display apparatus is presently used in various industrial fields.

The liquid crystal display apparatus requires a backlight assembly since a display panel of the liquid crystal display apparatus is not light self-emissive. A tubular-shaped cold cathode fluorescent lamp has been used for a light source of the liquid crystal display apparatus. In a large-scaled liquid crystal display apparatus, however, the numbers of the cold cathode fluorescent lamps and manufacturing costs increase, and optical properties such as brightness uniformity, and the like, are deteriorated.

Recently, in order to gain higher quality of color reproduction than possible with a cold cathode fluorescent lamp, a light emitting diode (LED) has been used for the light source in the backlight assembly of the liquid crystal display apparatus.

A large screen liquid crystal display apparatus, such as a monitor or a television receiver, includes red, green and blue diodes arranged under the liquid crystal display panel, thereby emitting white light.

Color reproducibility or brightness uniformity of the backlight assembly including the red, green and blue diodes arranged under the liquid crystal display panel is, however, deteriorated. Also, in the case that a gap between a diffusion sheet and the light emitting diodes is decreased in an effort to reduce the thickness of the liquid crystal display apparatus, cross stripes are displayed on the backlight assembly.

SUMMARY OF THE INVENTION

An exemplary embodiment of the present invention provides a backlight assembly for enhancing display properties and reducing the overall thickness of the display apparatus.

An exemplary embodiment of the present invention provides a display apparatus having the specialized backlight assembly.

In an exemplary embodiment of the present invention, a backlight assembly includes a circuit board and a plurality of point light source groups. The plurality of point light source groups includes N point light sources that generate different respective colors and being arranged on the circuit board. Here, N is a number of point light sources. One light source group of the light source groups is rotated by an angle of predetermined degrees in a clockwise direction or a counter-clockwise direction with respect to the other light source group that is adjacent to the one point light source group.

N may be greater than three and the predetermined rotation angle may be about 360/(k×N) degrees. Here, the k is a natural number.

In an exemplary embodiment, the first point light source may include a red diode generating red light, the second point light source may include a green diode generating green light, the third point light source may include a blue diode generating blue light and the fourth point light source may include a white diode generating white light. The first, second, third and fourth point light sources may be arranged in a shape of a squared form having substantially parallel sides with a column direction and a row direction of the matrix shape.

In an exemplary embodiment, the positions of the first, second, third and fourth point light sources of the first point light source group may be rotated by an angle of 90 degrees in a clockwise direction with respect to the first, second third and fourth point light sources of the second point light source group.

Alternatively, the positions of the first, second, third and fourth point light sources of the first point light source group may be rotated by an angle of 90 degrees in a counter-clockwise direction with respect to the first, second third and fourth point light sources of the second point light source group.

In an exemplary embodiment, a distance between adjacent point light source groups of adjacent columns and a distance between adjacent point light source groups of adjacent rows may be substantially the same.

In an exemplary embodiment, the positions of the first, second, third and fourth point light sources of the first point light source group may be rotated by an angle of about 180 degrees with respect to the positions of the first, second, third and fourth point light sources of a third point light source group that is disposed in a substantially perpendicular direction.

The backlight assembly may further include a diffusion plate disposed on the point light source groups and at least one optical sheet disposed on the diffusion plate.

In an exemplary embodiment of the present invention, a backlight assembly includes a circuit board and a plurality of point light source groups. The plurality of point light source groups may be arranged on the circuit board in a matrix shape having a plurality of rows and a plurality of columns. Each of the point light source groups has first, second, third and fourth point light sources generating different colors and is arranged in a substantially squared form. Positions of the first, second, third and fourth point light sources of a first point light source group may be rotated by an angle of about 180 degrees with respect to positions of the first, second, third and fourth point light sources of a second point light source group that is adjacent the first point light source group.

In an exemplary embodiment of the present invention, a backlight assembly may include a circuit board and a plurality of point light source groups. The plurality of point light source groups may be arranged on the circuit board in a matrix shape having a plurality of rows and a plurality of columns. Each of the point light source groups have first, second, third and fourth point light sources may generate different respective colors and the sources be arranged in a substantially squared form. Positions of the first, second, third and fourth point light sources of a first point light source group may be rotated by an angle of about 180 degrees with respect to positions of the first, second, third and fourth point light sources of a second point light source group that is in the same row as the first point light source group and adjacent to the first point light source. The positions of the first, second, third and fourth point light sources of the first point light source group may be rotated by an angle of about 90 degrees with respect to the positions of the first, second, third and fourth point light sources of a third point light source group that is in the same column as the first point light source group and adjacent the first point light source.

In an exemplary embodiment of the present invention, a display apparatus includes a backlight assembly and a display panel. The backlight assembly includes a circuit board and a plurality of point light source groups. The plurality of point light source groups includes N point light sources that generate different respective colors and being arranged on the circuit board. Here, N is a number of point light sources. One light source group of the light source groups is rotated by an angle of predetermined degrees in a clockwise direction or a counter-clockwise direction with respect to the other light source group that is adjacent to the one point light source group.

N may be greater than three and the predetermined rotation angle may be about 360/(k×N) degrees. Here, the k is a natural number.

The plurality of point light source groups may be arranged on the circuit board in a matrix shape having a plurality of rows and a plurality of columns. Each of the point light source groups may include first, second, third and fourth point light sources generating different respective colors and is arranged in a substantially squared form. Positions of the first, second, third and fourth point light sources of a first point light source group may be rotated by an angle of about 90 degrees with respect to positions of the first, second, third and fourth point light sources of a second point light source group that is in the same row as the first point light source group and adjacent the first is point light source group. The display panel displays images by using light from the backlight assembly.

According to the above, a backlight assembly and a display apparatus having the same reduces thickness of a product and eliminates cross stripes.

BRIEF DESCRIPTION OF THE DRAWINGS

Exemplary embodiments of the present invention will be understood in more detail from the following descriptions taken in conjunction with the accompanying drawings wherein:

FIG. 7 is a plan view illustrating an arrangement of point light sources in accordance with an exemplary embodiment of point light source groups in FIG. 2.

DESCRIPTION OF EXEMPLARY EMBODIMENTS

The invention is described more fully hereinafter with reference to the accompanying drawings, in which exemplary embodiments of the invention are illustrated. This invention may, however, be embodied in many different forms and should not be construed as limited to the exemplary embodiments set forth herein. Rather, these exemplary embodiments are provided so that this disclosure will be thorough and complete, and will fully convey the scope of the invention to those skilled in the art.

Hereinafter, exemplary embodiments of the present invention will be explained in detail with reference to the accompanying drawings, in which like elements are represented by the same reference number.

Figure 1:
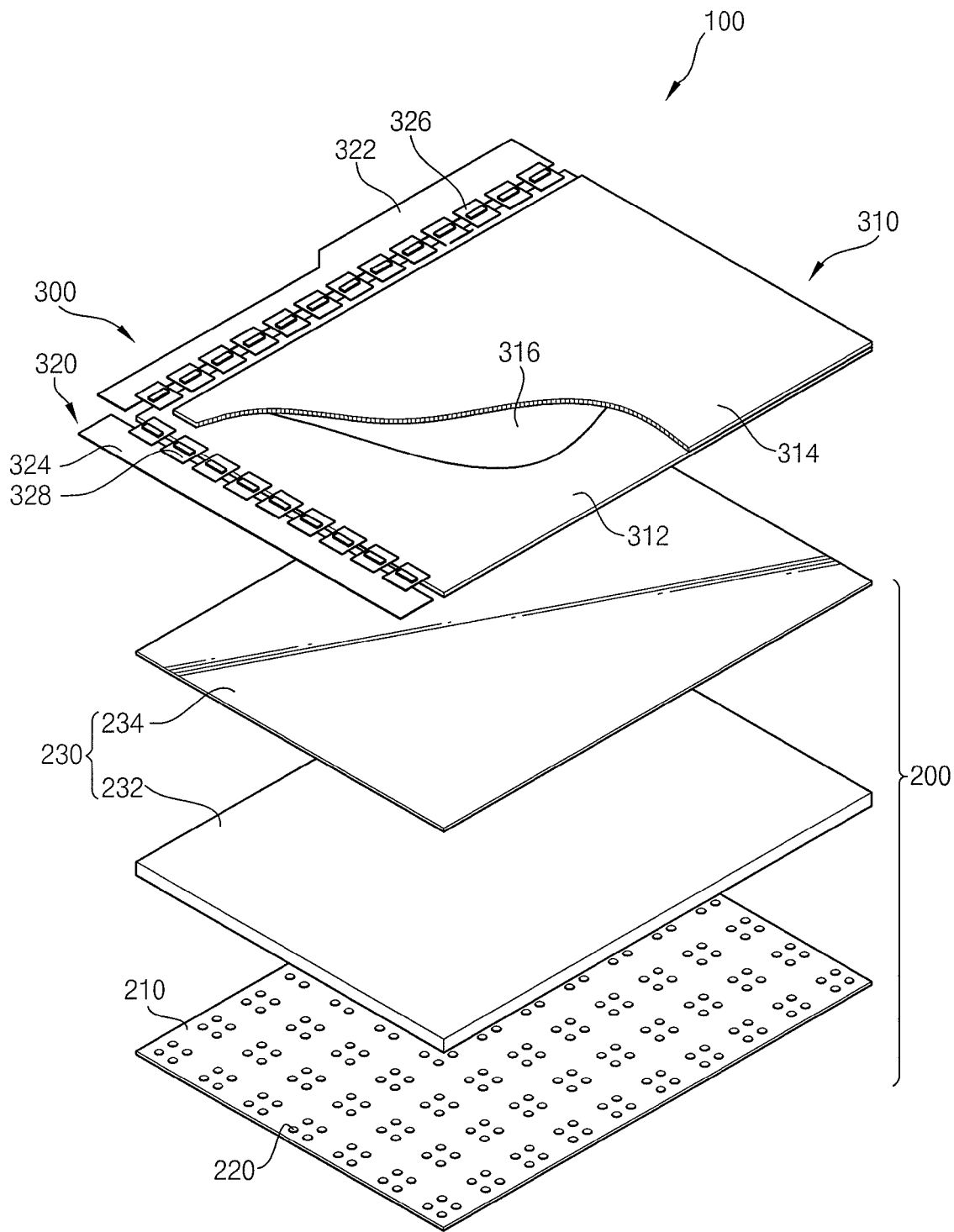
FIG. 1 is an exploded perspective view illustrating a display apparatus in accordance with an exemplary embodiment of the present invention.
Figure 2:
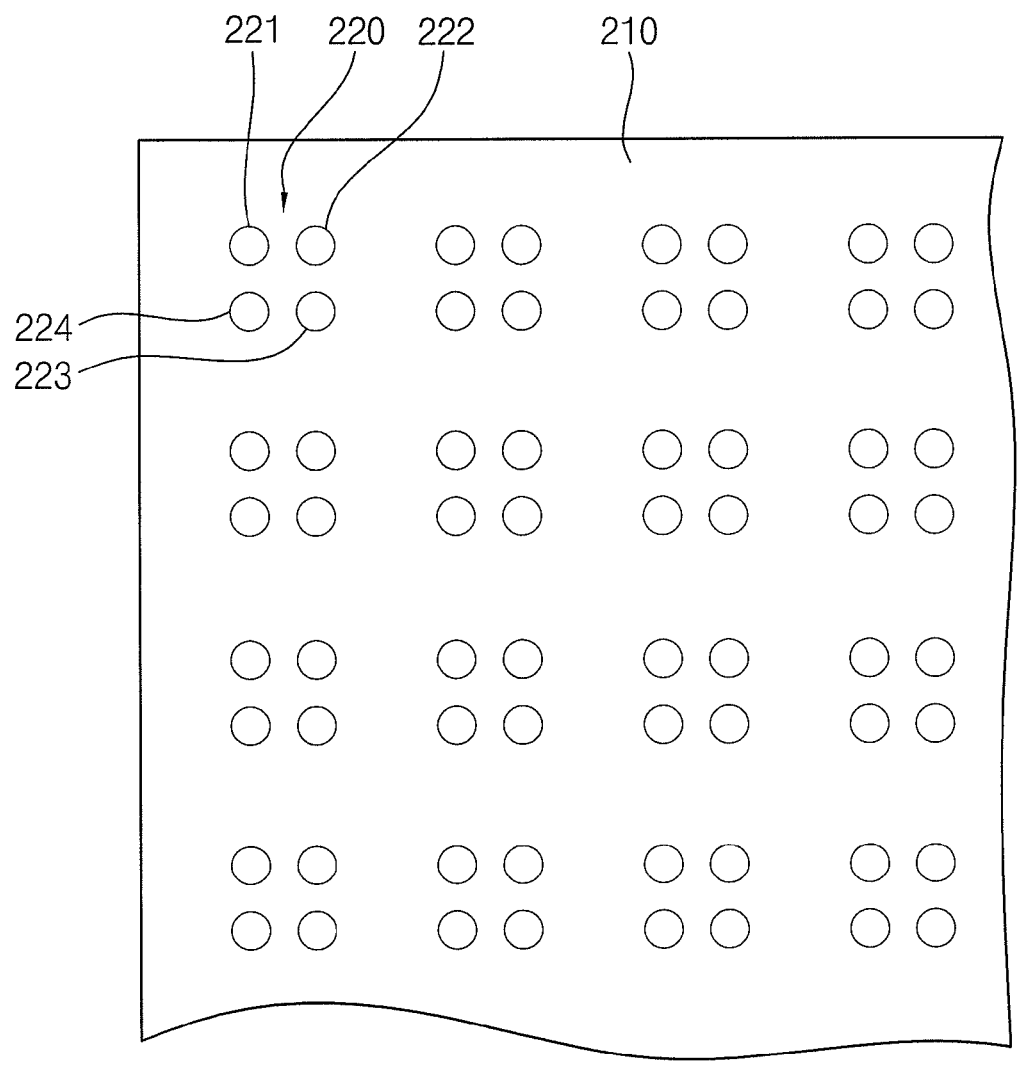
FIG. 2 is a perspective view illustrating a circuit board having point light source groups in FIG. 1.

FIG. 1 is an exploded perspective view illustrating a display apparatus in accordance with an exemplary embodiment of the present invention. FIG. 2 is a perspective view illustrating a circuit board having point light source groups in FIG. 1.

Referring to FIG. 1 and FIG. 2, a display apparatus 100 in accordance with an exemplary embodiment of the present invention includes a backlight assembly 200 and a display unit 300. The backlight assembly 200 generates light, and the display unit 300 displays images using the light from the backlight assembly 200.

The backlight assembly 200 includes a circuit board 210 and point light source groups 220 that are disposed on the circuit board 210.

The circuit board 210 has a shape of a substantially squared plate form. For example, the circuit board 210 may be formed as a printed circuit board (PCB) or a metal coated printed circuit board (MCPCB) coated by metal with high thermal conductivity. A power supply line (not illustrated) is disposed on the circuit board 210. The power supply line supplies power from outside to the point light source groups 220.

The circuit board 210 may include a structure that is divided into a plurality segments of a bar shape.

The point light source groups 220 are disposed on the circuit board 210 as a is plurality of columns and rows. For example, the point light source groups 220 are arranged in a matrix shape. The point light source groups may be disposed in a zigzag configuration. The point light source groups 220 generate light by power from a power source through the power supply line of the circuit board 210.

The point light source groups 220 are disposed along a column direction in which the distance between the point light source groups 220 is constant. The point light source groups 220 are arranged along a row direction in which the distance between the point light source groups 220 is constant. In an exemplary embodiment the distance of the column direction and the distance of the row direction may be substantially the same as each other.

Each of the point light source groups 220 may include a plurality of point light sources. For example, each of the point light source groups may include N point light sources. Here, "N" is the number of point light sources. The N point light sources may be arranged in various shapes like a substantially polygonal shape, a circle shape, etc. Each of point light sources may generate each different color, respectively. Referring to FIG. 2, Each of the point light source groups 220 includes a first point light source 221, a second point light source 222, a third point light source 223 and a fourth point light source 224 illustrated in FIG. 2. Each of the first point light source 221, second point light source 222, third point light source 223 and the fourth point light source 224 generates different respective colors of light. The first point light source 221, the second point light source 222, the third point light source 223, and the fourth point light source 224 are arranged in a substantially squared shape. In FIGS. 1 and 2, the sides of the squared form constructed by the first point light source 221, the second point light source 222, the third point light source 223 and the fourth point light source 224 are respectively substantially parallel with a column direction and a row direction of the point light source groups 220.

Each of the point light source groups 220 includes a red light emitting diode, a green light emitting diode, a blue light emitting diode and a white light emitting diode. For example, when the point light sources includes four point light sources, the first point light source 221 includes the red light emitting diode generating red light; the second point light source 222 includes the green light emitting diode generating green light; the third point light source 223 includes the blue light emitting diode generating blue light; and the fourth point light source 224 includes the white light emitting diode generating white light. The first point light source 221, the second point light source 222, the third point light source 223 and the fourth point light source 224 of the point light source groups 220 are uniformly disposed for preventing cross stripes.

FIGS. 3 to 6 are plan views illustrating an arrangement of point light sources in accordance with an exemplary embodiment of the point light source groups illustrated in FIG. 2.

In FIGS. 3 to 6, a first point light source includes a red light emitting diode R; a second point light source includes a green light emitting diode G; a third point light source includes a blue light emitting diode B; and a fourth point light source includes a white light emitting diode W.

Referring to FIGS. 2 to 6, the point light sources of a row include the first point is light source R (221 illustrated in FIG. 2), the second point light source G (222 illustrated in FIG. 2), the third point light source B (223 illustrated in FIG. 2), and the fourth point light source W (224 illustrated in FIG. 2) that are arranged in sequence in a clockwise direction at mutual respective angles of about 90 degrees. For example, in the same row, the first, second, third and fourth point light sources R, G, B and W of one point light source group 220 are rotated by an angle of about 90 degrees in the clockwise direction with respect to the first, second, third and fourth point light sources R, G, B and W of the next adjacent point light source group. Thus, the point light source group 220 having substantially the same arrangement is repeatedly disposed in the same row every four point light source groups. The first point light source R, the second point light source G, the third point light source B, and the fourth point light source W of a leftmost point light source group 220 in each row may have various different arrangements.

Alternatively, in the same row, the first, second, third and fourth point light sources R, G, B and W of the point light source group 220 may be rotated by an angle of about 90 degrees in the counter-clockwise direction with respect to the first, second, third and fourth point light sources R, G, B and W of the adjacent point light source group 220.

A first point light source group including N point light sources may be rotated by an angle of predetermined degrees in a clockwise direction or a counterclockwise direction with respect to a second light source group that is adjacent to the first point light source group. For example, when each of the point light source groups may include N point light sources, the point light sources of each of the point light source groups are arranged in sequence at mutual respective angles of about 360/N degrees along a substantially horizontal direction or a substantially perpendicular direction. The rotation angles may have 360/(k*N) degrees, here k is a natural number.

In the same column, the first, second, third and fourth point light sources R, G, B and W of the point light source group 220 are rotated by an angle of about 180 degrees in the clockwise direction with respect to the first, second, third and fourth point light sources R, G, B and W of the adjacent point light source group 220. Thus, the point light source groups 220 having substantially the same arrangement are repeatedly disposed in the same column every two point light source groups.

Figure 3:
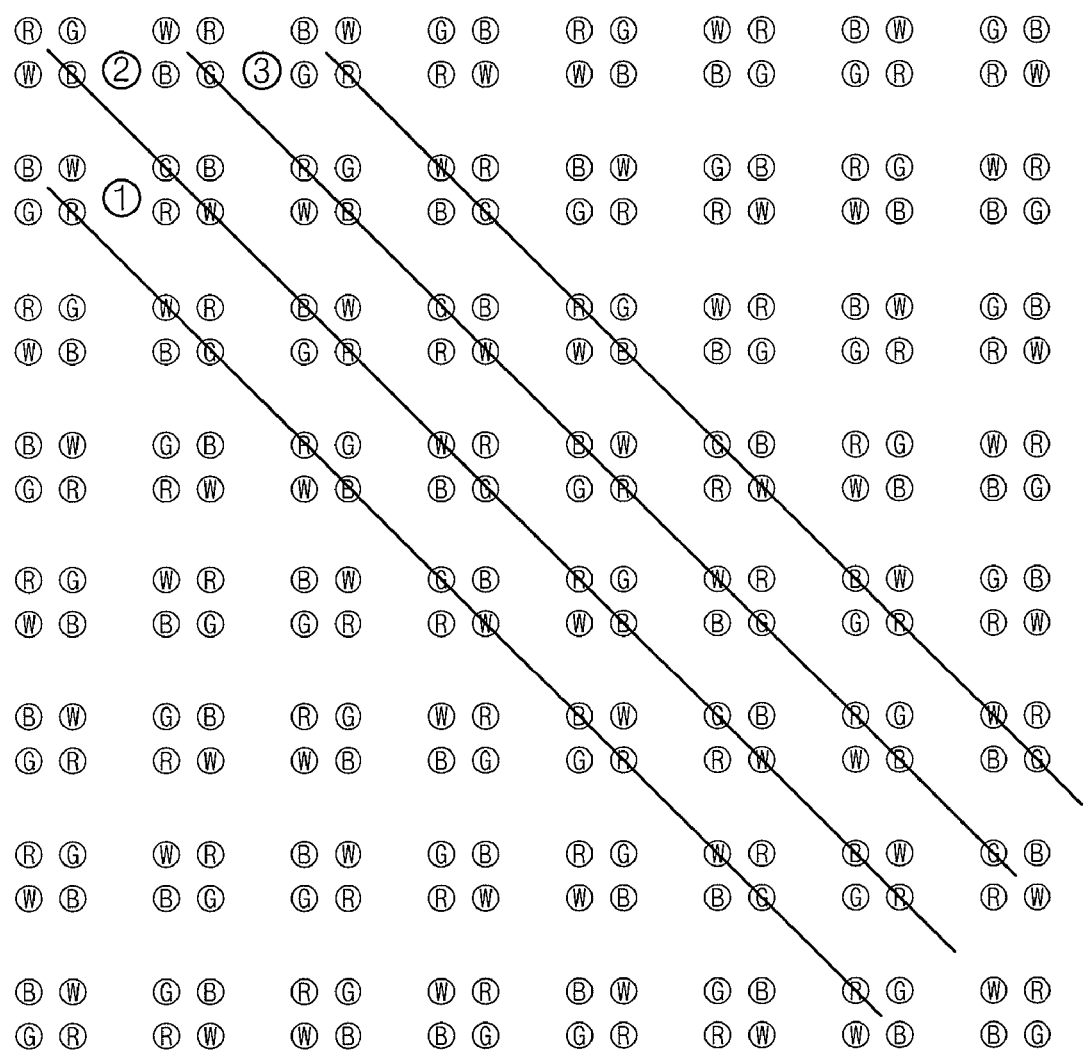
FIGS. 3 to 6 are plan views illustrating an arrangement of point light sources in accordance with an exemplary embodiment of point light source groups in FIG. 2.

Referring to FIG. 3, the first point light source R, the second point light source G, the third point light source B, and the fourth point light source W are rotated in the clockwise direction at the angle of about 90 degrees in the row direction, and are rotated at the angle of about 180 degrees in the column direction. When the first, second, third and fourth point light sources R, G, B and W are divided by lines overlapping diagonals of each of the point light source groups 220 from an upper left corner to a lower right corner, the first, second, third and fourth point light sources R, G, B and W are divided into a plurality of districts ①, ② and ③. In the first district ①, two first point light sources R, two second point light sources G, two third point light sources B and two fourth point light sources W are repeatedly arranged, in sequence, so that the first, second, third and fourth point light sources R, G, B and W are uniformly disposed. In the second district ②, two third point light sources B, two fourth point light sources W, two first point light sources R and two second point light sources G are repeatedly arranged, in sequence, so that the third, fourth, first and second point light sources B, W, R and G are uniformly disposed. In the third district ③, two second point light sources G, two third point light sources B, two fourth point light sources W and two first point light sources R are repeatedly arranged, in sequence, so that the second, third, fourth and first point light sources G, B, W and R are uniformly disposed.

Figure 4:
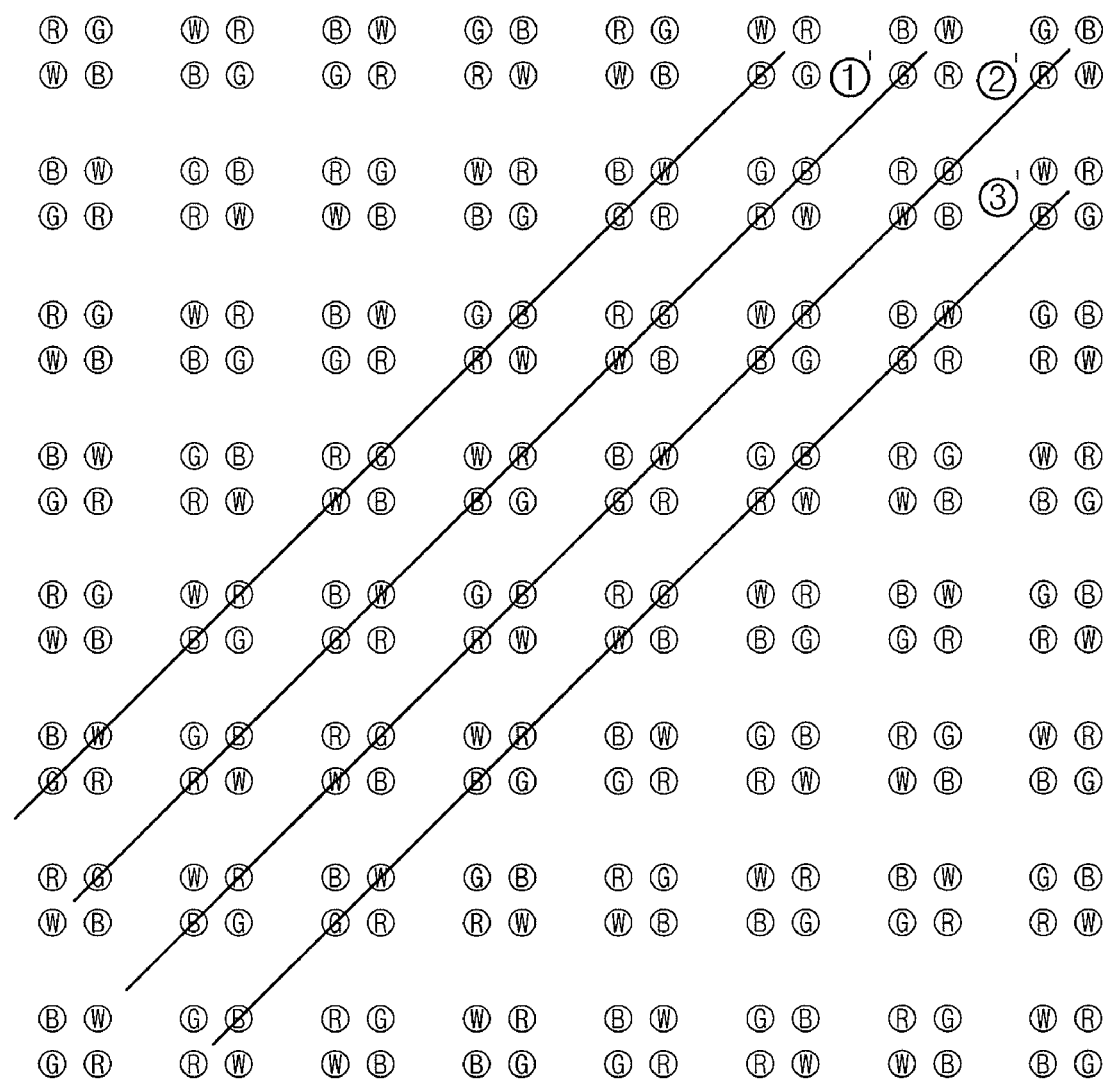

Referring to FIG. 4, the first point light source R, the second point light source G the third point light source B, and the fourth point light source W are rotated in the clockwise direction at the angle of about 90 degrees in the row direction, and are rotated at the angle of about 180 degrees in the column direction. When the first, second, third and fourth point light sources R, G, B and W are divided by lines overlapping diagonals of each of the point light source groups 220 from an upper right corner to a lower left corner, the first, second, third and fourth point light sources R, G, B and W are divided into a plurality of districts ①', ②' and ③'. In the first district ①', two second point light sources G, two first point light sources R, two fourth point light sources W and two third point light sources B are repeatedly arranged, in sequence, so that the second, first, fourth and third point light sources G, R, W and B are uniformly disposed. In the second district ②', two first point light sources R, two fourth point light sources W, two third point light sources B and two second point light sources G are repeatedly arranged, in sequence, so that the first, fourth, first and second point light sources are uniformly disposed. In the third district ③', two third point light sources B, two second point light sources G, two first point light sources R and two fourth point light sources W are repeatedly arranged, in sequence, so that the third, second, first and fourth point light sources B, G, R and W are uniformly disposed.

As illustrated in FIGS. 3 and 4, the first, second, third and fourth point light sources R, G, B and W are uniformly distributed in the districts ①, ②, ③, ①', ②' and ③' that are defined by the lines overlapping the diagonals of each of the point light source groups 220. As a result, when a backlight assembly is relatively thinner, cross stripes are not displayed.

Figure 5:
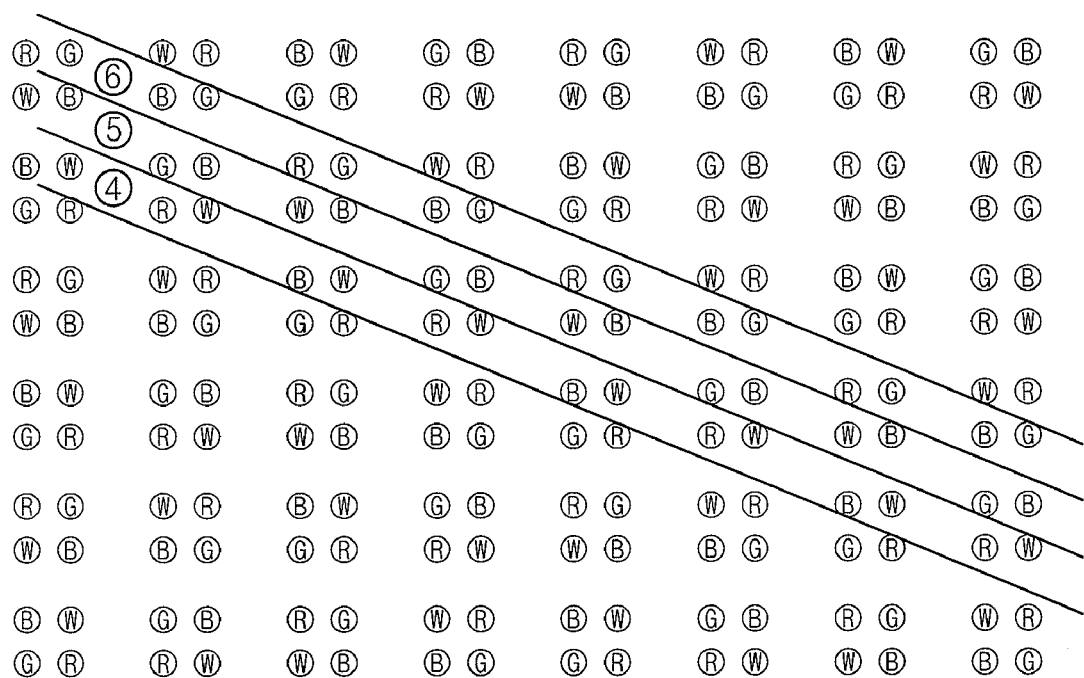

Referring to FIG. 5, the first point light source R, the second point light source G, the third point tight source B, and the fourth point light source W are rotated in the clockwise direction at the angle of about 90 degrees in the row direction, and are rotated at the angle of about 180 degrees in the column direction. When the first, second, third and fourth point light sources R, G, B and W are divided by lines forming an angle of about 63.5 degrees with respect to a column direction, which are extended from an upper left portion of the backlight assembly, the first, second, third and fourth point light sources R, G, B and W are divided into a plurality of districts ④, ⑤ and ⑥. In the first district ④, the first point light source R, the fourth point light source W, the third point light source B and the fourth point light source W are repeatedly arranged, in sequence, so that the first, fourth and third point light sources R, W and B are uniformly disposed in the second district ⑤, the second point light source G, the third point light source B, the fourth point light source W and the third point light source B are repeatedly arranged, in sequence, so that the second, third and fourth point light sources G, B and W are uniformly disposed. In the third district ⑥, the first point light source R, the second point light source G, the first point light source R and the second point light source G are repeatedly arranged, in sequence, so that the first, second, and third point light sources R, G, and B are uniformly disposed.

Figure 6:
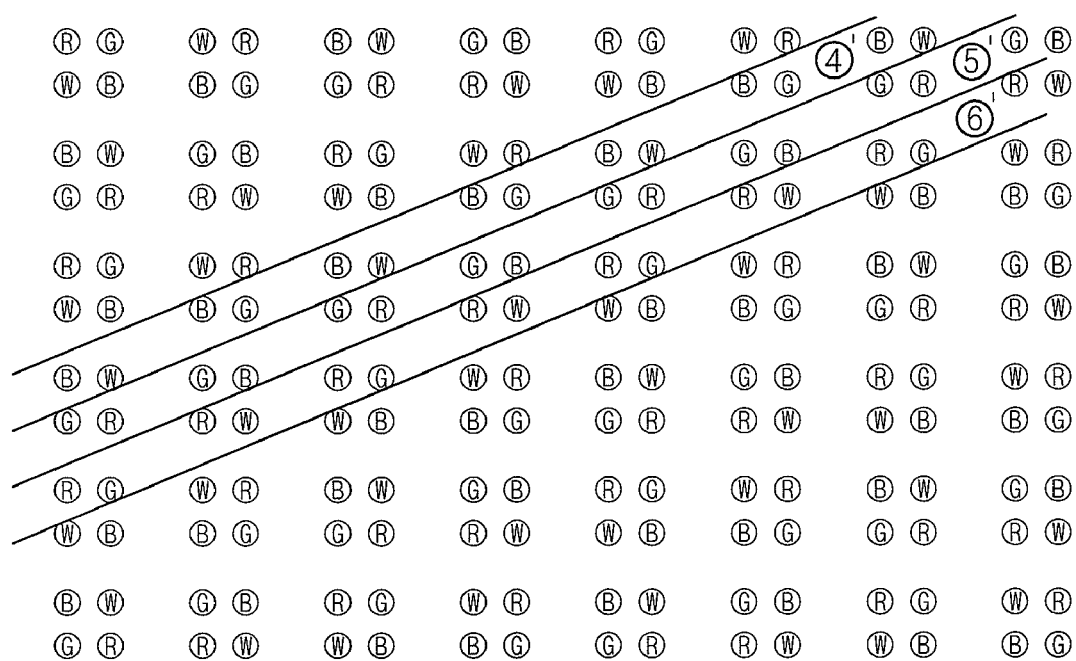

Referring to FIG. 6, the first point light source R, the second point light source G, the third point light source B, and the fourth point light source W are rotated in the clockwise direction at the angle of about 90 degrees in the row direction, and are rotated at the angle of about 180 degrees in the column direction. When the first, second, third and fourth point light sources R, G, B and W are divided by lines forming an angle of about 63.5 degrees with respect to the column direction, which are extended from a upper right portion of the backlight assembly, the first, second, third and fourth point light sources R, G, B and W are divided into a plurality of districts ④', ⑤' and ⑥'. In the first district ④', the second point light source G, the third point light source B, the fourth point light source W and the third point light source B are repeatedly arranged, in sequence, so that the second, third and fourth point light sources G, B and W are uniformly disposed. In the second district ⑤', the first point light source R, the second point light source G, the third point light source B and the second point light source G are repeatedly arranged, in sequence, so that the first, second and third point light sources R, G and B are uniformly disposed. In the third district ⑥', the second point light source G, the first point light source R, the fourth point light source W and the first point light source R are repeatedly arranged, in sequence, so that the second, first and fourth point light sources G, R and W are uniformly disposed.

Referring to FIG. 5 and FIG. 6, the first, second, third and fourth point light sources R, G, B and W are uniformly distributed in the districts ④, ⑤, ⑥, ④', ⑤' and ⑥' that are defined by the lines forming the angle of about 63.5 degrees with respect to the column direction. Thus, three colors are uniformly mixed in each of the districts ④, ⑤, ⑥, ④', ⑤' and ⑥', and different colors are mixed in adjacent districts so that cross stripes are not displayed on the backlight assembly.

Figure 7:
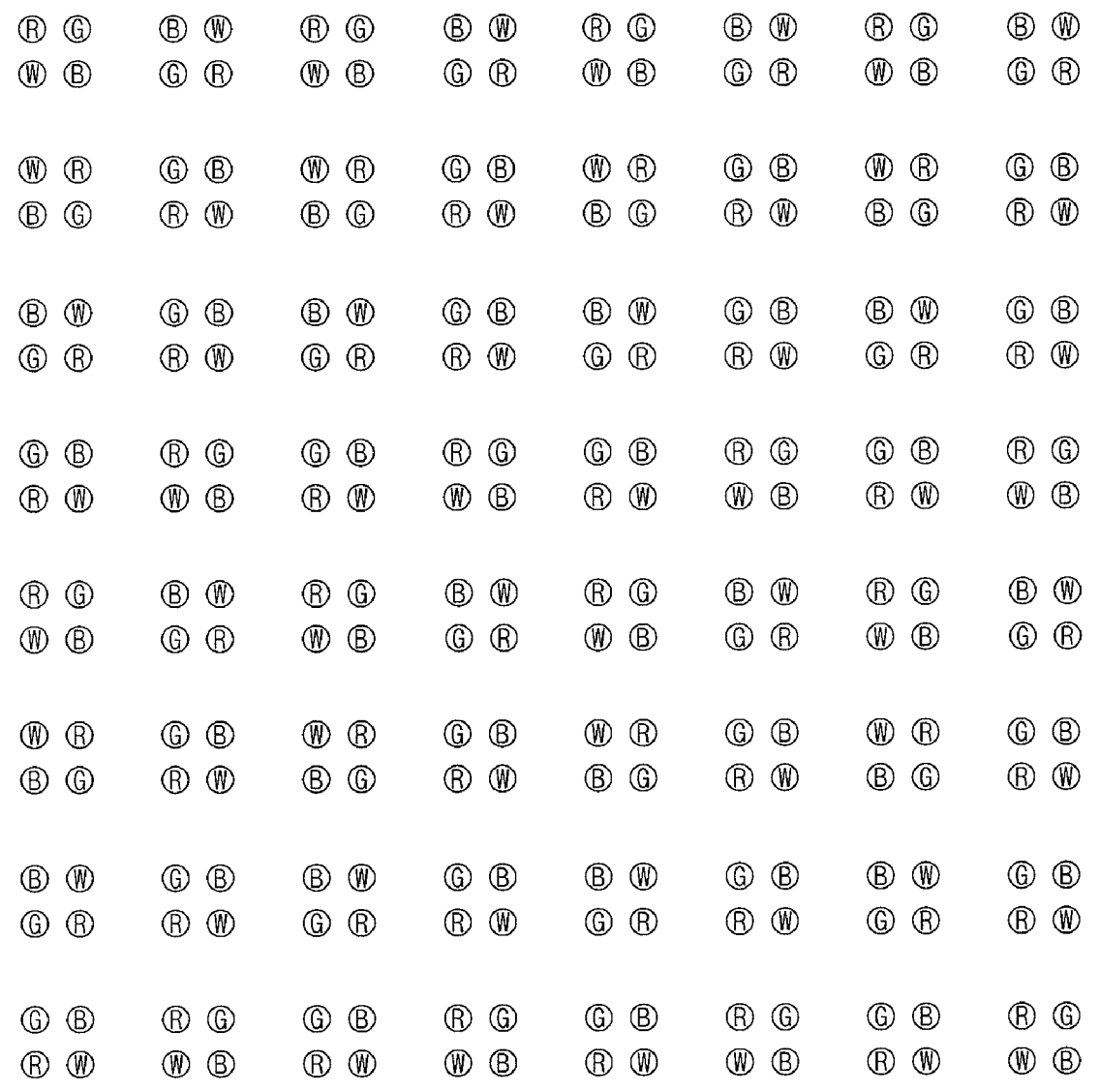

FIG. 7 is a plan view illustrating an arrangement of point light sources in accordance with an exemplary embodiment of point light source groups illustrated in FIG. 2.

In FIG. 7, a first point light source R generates red light; a second point light source G generates green light; a third point light source B generates blue light; and a fourth point light source W generates white light.

Referring to FIGS. 2 and 7, in the point light sources of the same row, the first point light source R (221 illustrated in FIG. 2), the second point light source G (222 illustrated in FIG. 2), the third point light source B (223 illustrated in FIG. 2), and the fourth point light source W (224 illustrated in FIG. 2) are sequentially arranged in a clockwise direction by an angle of about 90 degrees. For example, in the same row, the first, second, third and fourth point light sources R, G, B and W of one point light source group 220 are rotated by an angle of 180 degrees in the clockwise direction with respect to the first, second, third and fourth point light sources R, G, B and W of adjacent point light source group 220. Thus, the point light source groups 220 having substantially the same arrangement are repeatedly disposed in the same row every two point light source groups 220.

In the same column, the first, second, third and fourth point light sources R, G, B and W of the point light source group 220 are rotated by an angle of 90 degrees in the clockwise direction with respect to the first, second, third and fourth point light sources R, G, B and W of the adjacent point light source group 220. Thus, the point light source groups 220 having substantially the same arrangement are repeatedly disposed in the same column every four point light source groups 220. The first, second, third and fourth point light sources R, G, B and W of the point light source groups 220 in the same column may have various arrangements.

Alternatively, in the same column, the first, second, third and fourth point light sources R, G, B and W may be rotated by an angle of about 90 degrees in a counter-clockwise direction.

The arrangement of the point light source groups 220 in FIG. 7 may be substantially the same as the arrangement of the point light source groups 220 in FIG. 3, except for the column and row directions. Thus, the same effects with the above exemplary embodiment may be obtained.

Referring again to FIG. 1, the backlight assembly 200 may further include an optical member 230 disposed on the point light source groups 220.

The optical member 230 may include a diffusion plate 232 facing the point light source groups 220. The diffusion plate 232 diffuses light from the point light source groups 220 and enhances brightness uniformity. The diffusion plate 232 has a plate form and a constant thickness. The diffusion plate 232 includes transparent material for transmitting light and includes diffusion particles. For example, the diffusion plate 232 may be formed of polymethyl methacrylate (PMMA).

The optical member 230 may further include at least one optical sheet 234 disposed on the diffusion plate 232. The optical sheet 234 forms a diffusion sheet enhancing brightness uniformity by re-diffusing light diffused by the diffusing plate 232. For example, the optical sheet 234 may further include a light condensing sheet enhancing front brightness in a vertical direction by condensing light diffused by the diffusing plate. The optical sheet 234 may further include a reflecting-polarizing light sheet (not illustrated) for enhancing brightness by transmitting a portion of the light, which has been diffused by the diffusing plate and vibrates in a polarizing axis, and reflecting a remaining portion of the light. Alternatively, the optical sheet 234 may include other optical sheets having various functions according to the brightness properties required from the backlight assembly.

The display unit 300 includes a display panel 310 displaying images by using the light from the backlight assembly 200 and a circuit board 320 providing signals for driving the display panel 310.

The display panel 310 includes a first substrate 312, a second substrate 314 facing the first substrate 312 and a liquid crystal layer 316 disposed between the first substrate 312 and the second substrate 314.

The first substrate 312, for example, is a thin film transistor substrate. Thin film transistors or switching devices are disposed on the thin film transistor substrate in a matrix shape. The source terminal and gate terminal of each thin film transistor is connected to a respective data line and gate line. The drain terminal of the thin film transistor is connected to a pixel electrode including transparent conductive material.

The second substrate 314, for example, is a color filter substrate having red (R), green (G) and blue (B) color filters used for displaying colors. Each of the R, G and B color filters has a thin film form. A common electrode is disposed on the second substrate 314. The common electrode includes a transparent conductive material. Alternatively, the color filter may be disposed on the first substrate 312.

A driving circuit part 320 includes a data printed circuit board 322, a gate is printed circuit board 324, a data driving circuit film 326 and a gate driving circuit film 328. The data printed circuit board 322 applies data driving signals to the display panel 310, and the gate printed circuit board 324 applies gate driving signals to the display panel 310. The data driving circuit film 326 connects the data printed circuit board 322 with the display panel 310, and the gate driving circuit film 328 connects the gate printed circuit board 324 with the display panel 310.

In this exemplary embodiment, each of the data driving circuit film 326 and the gate driving circuit film 328 may include a tape carrier package (TCP) or a chip on glass (COG). The tape carrier package (TCP) or the chip on glass (COG) includes data driving chips or gate driving chips. Alternatively, additional signal lines may be formed on the display panel 310 and the gate driving circuit film 328, so that the gate printed circuit board 324 may be omitted.

When the gate signal and the data signal are applied to the gate terminal and the source terminal of a thin film transistor to turn on the thin film transistor, an electric field is formed between the common electrode and a pixel electrode. An arrangement of liquid crystal molecules of the liquid crystal layer 316 between the first substrate 312 and the second substrate 314 is changed. Thus, light transmissivity of the liquid crystal layer 316 is changed. As a result, the images are displayed on the display panel 310.

According to the backlight assembly and the display apparatus having the backlight assembly of an exemplary embodiment of the present invention, the thickness of a display apparatus is reduced and quality deterioration, such as cross stripes, is removed by arranging specific color point light sources in the above-mentioned distribution.

Although exemplary embodiments of the present invention have been described, it is understood that the present invention should not be limited to these exemplary embodiments but various changes and modifications can be made by one of ordinary skill in the art within the spirit and scope of the present invention as hereinafter claimed.

What is claimed is:

1. A backlight assembly comprising:
   a circuit board; and
   a plurality of point light source groups arranged on the circuit board in a matrix shape having a plurality of rows and a plurality of columns, each of the point light source groups having red, green, blue and white point light sources arranged in a substantially squared form,
   wherein a first point light source group is adjacently disposed at a left side of a second point light source group, and a third point light source group is adjacently disposed at a right side of the second point light source group,
   wherein the first point light source group, the second point light source group and the third point light source group are arranged in the same row,
   wherein positions of the red, green, blue and white point light sources of the second point light source group are rotated by an angle of about 90 degrees in a clockwise direction with respect to positions of the red, green, blue and white point light sources of the first point light source group, and positions of the red, green, blue and white point light sources of the third point light source group are rotated by an angle of about 90 degrees in a clockwise direction with respect to the positions of the red, green, blue and white point light sources of the second point light source group.

2. The backlight assembly of claim 1, wherein a distance between adjacent point light source groups are substantially the same.

3. The backlight assembly of claim 1, wherein a fourth point light source group is adjacently disposed at a lower side of the first point light source group, and the first point light source group and the fourth point light source group is arranged in the same column,
   wherein positions of the red. green, blue and white point light sources of the fourth point light source group are rotated by an angle of about 180 degrees with respect to the positions of the red, green, blue and white point light sources of the first point light source group.

4. The backlight assembly of claim 1, further comprising:
   a diffusion plate disposed on the point light source groups; and
   at least one optical sheet disposed on the diffusion plate.

5. A backlight assembly comprising:
   a circuit board; and
   a plurality of point light source groups arranged on the circuit board in a matrix shape having a plurality of rows and a plurality of columns, each of the point light source groups having red, green, blue and white point light sources arranged in a substantially squared form,
   wherein a first point light source group is adjacently disposed at a left side of a second point light source group, and a third point light source group is adjacently disposed at a right side of the second point light source group,
   wherein the first point light source group, the second point light source group and the third point light source group are arranged in the same row,
   wherein positions of the red, green, blue and white point light sources of the second point light source group are rotated by an angle of about 90 degrees in a counter-clockwise direction with respect to positions of the red, green, blue and white point light sources of the first point light source group, and positions of the red, green, blue and white point light sources of the third point light source group are rotated by an angle of about 90 degrees in a counter-clockwise direction with respect to the positions of the red, green, blue and white point light sources of the second point light source group.

6. The backlight assembly of claim 5, wherein a fourth point light source group is adjacently disposed at a lower side of the first point light source group, and the first point light source group and the fourth point light source group is arranged in the same column,
   wherein the positions of the red, green, blue and white point light sources of the fourth point light source group are rotated by an angle of about 180 degrees with respect to the positions of the red, green, blue and white point light sources of the first point light source group.

* * * * *